US009436268B2

(12) United States Patent
de Santiago Domínguez et al.

(10) Patent No.: US 9,436,268 B2
(45) Date of Patent: Sep. 6, 2016

(54) SYSTEM POWER CONTROL USING A POWER SUPPLY TO PROVIDE VOLTAGE TO SUBSYSTEMS IN WHICH A SUBSYSTEM DETERMINES ITS OPERATING STATE BASED ON THE VOLTAGE RECEIVED BY THE SUBSYSTEM

(71) Applicant: Hewlett-Packard Development Company, L.P., Houston, TX (US)

(72) Inventors: Sergio de Santiago Domínguez, Barcelona (ES); Javier González Bruno, Terrassa Barcelona (ES); Jordi Ferran Cases, Santa Maria de Palautordera (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 475 days.

(21) Appl. No.: 13/628,954

(22) Filed: Sep. 27, 2012

(65) Prior Publication Data

US 2014/0089704 A1 Mar. 27, 2014

(51) Int. Cl.
*G06F 1/26* (2006.01)
*G06F 1/00* (2006.01)
*G06F 1/32* (2006.01)

(52) U.S. Cl.
CPC .......... *G06F 1/3284* (2013.01); *Y02B 60/1267* (2013.01); *Y02B 60/32* (2013.01)

(58) Field of Classification Search
CPC ........................................................ G06F 1/32
USPC ................................................ 713/323, 320
See application file for complete search history.

(56) References Cited

U.S. PATENT DOCUMENTS

| | | | |
|---|---|---|---|
| 6,131,166 A | 10/2000 | Wong-Insley | |
| 7,424,632 B2 | 9/2008 | Powers et al. | |
| 8,156,362 B2 | 4/2012 | Branover et al. | |
| 8,448,001 B1* | 5/2013 | Zhu et al. | 713/322 |
| 2002/0178387 A1 | 11/2002 | Theron | |
| 2003/0233591 A1 | 12/2003 | Chiteboun et al. | |
| 2006/0053311 A1* | 3/2006 | Chary | 713/300 |
| 2011/0022859 A1* | 1/2011 | More et al. | 713/300 |
| 2011/0173473 A1* | 7/2011 | Cho | 713/323 |
| 2011/0264934 A1* | 10/2011 | Branover | G06F 1/3203 713/320 |
| 2011/0304208 A1 | 12/2011 | Lee et al. | |

OTHER PUBLICATIONS

"System Power States", http://msdn.microsoft.com/en-us/library/windows/desktop/aa373229(v=vs.85).aspx.

* cited by examiner

*Primary Examiner* — Robert Cassity
(74) *Attorney, Agent, or Firm* — HP Inc.—Patent Department

(57) ABSTRACT

A power control unit 16 controls the power consumed by a system 10 having a plurality of electrical power consumption states including an active state and at least one power saving state. The system comprises a plurality of subsystems 12 each having a plurality of subsystem power states including an active state and at least one power saving state. The electrical power consumption states of the system correspond to respective different configurations of subsystem power states of the subsystems and the power control unit is arranged for signal interface with the subsystems and a power supply unit 14 of the system for controlling the subsystem power states of each of the subsystems and the power supplied to each of the subsystems by the power supply unit dependent on the required power consumption state of the system.

20 Claims, 2 Drawing Sheets

SYSTEM POWER CONTROL USING A POWER SUPPLY TO PROVIDE VOLTAGE TO SUBSYSTEMS IN WHICH A SUBSYSTEM DETERMINES ITS OPERATING STATE BASED ON THE VOLTAGE RECEIVED BY THE SUBSYSTEM

BACKGROUND

The electrical power consumed by a system can be reduced by putting the system into a low power mode when it is not being used. The system can be reactivated when use is required. The low power mode allows the system to conserve energy.

BRIEF DESCRIPTION OF THE DRAWINGS

In the disclosure that follows, reference will be made to the drawings, in which.

DETAILED DESCRIPTION

Figure 1:
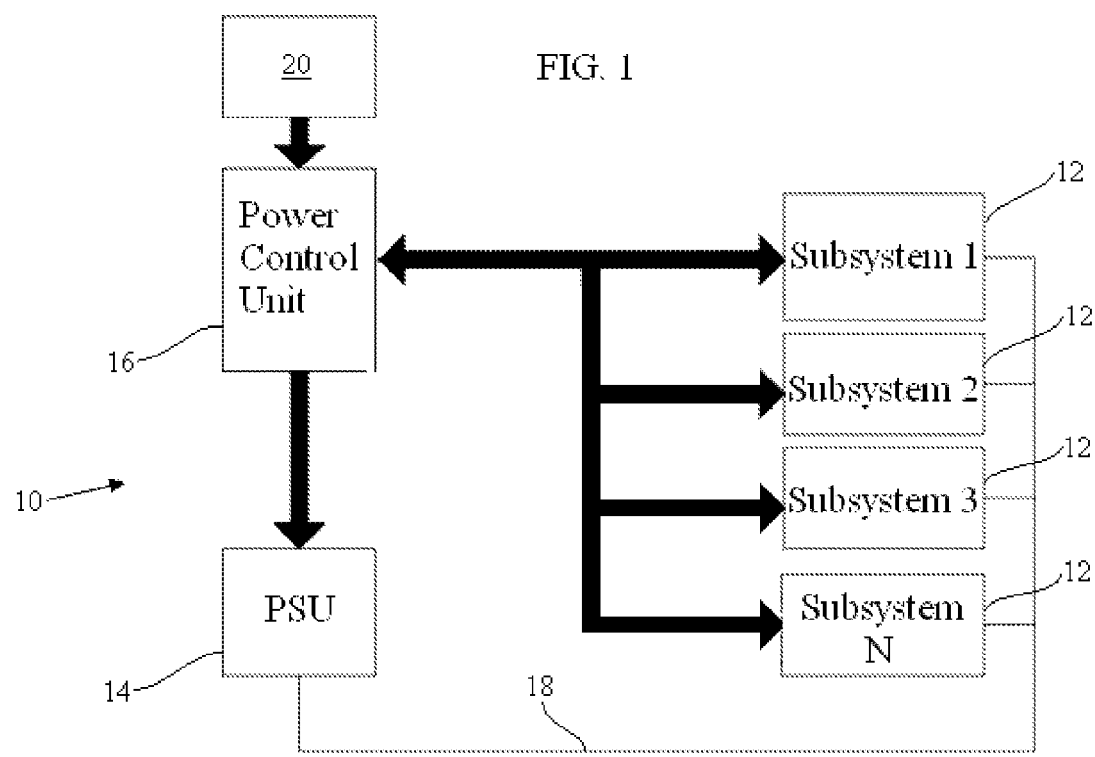
FIG. 1 is a schematic drawing of a system including a power control unit according to an example.

Referring to FIG. 1, a system 10 is shown which comprises a power control unit. The system may be a computing system, such as a computer, printer, scanner, monitor or other electrically powered digital device. The system has a plurality of electrical power consumption states including an active state and at least one power saving state. The active state is a working state of the system and a power saving state is a state in which the system consumes less power than in the active state, for example a sleep state, a hibernate state or an auto-off state.

The system comprises a plurality of subsystems 12 which co-operate to perform the required functions of the system. There may be any number of subsystems from 2 to 'N' as shown in FIG. 1. If the system is a printer, there may be subsystems including a formatter, lan card, engine PCA, front panel, scanner, analog electronics or wireless communication module. The system additionally comprises a power supply unit, or PSU 14 for supplying power to the subsystems. Each subsystem has a plurality of subsystem power states including an active state and at least one power saving state. The active state is a working state of the system and a power saving state is a state in which the subsystem consumes less power than in the active state, for example a sleep mode. The electrical power consumption states of the system correspond to respective different configurations of subsystem power states of the subsystems.

A power control unit 16 controls the power consumed by the system 10 and is arranged for signal interface with the subsystems 12 and the power supply unit 14 for controlling the subsystem power states of each of the subsystems and the power supplied to each of the subsystems by the power supply unit dependent on the required power consumption state of the system.

The power control unit is arranged to send signals to and receive signals from each of the subsystems, as shown by the bold arrows in FIG. 1. The signals are associated with a required power consumption state of the system.

For example, a signal sent from the power control unit to a subsystem may be configured to cause the subsystem to enter one of its power consumption states dependent on the required power consumption state of the system. Different signals may be required to cause the respective subsystems to change from one subsystem power consumption states to another subsystem power consumption state and the power control unit is arranged to interface with each of the subsystems and generate the required signals associated with each of the subsystems. In this regard and in the case of a printer, the signals required to change a power consumption state of one printer subsystem (e.g. a scanner subsystem) may be different from the signals required to change a power consumption state of another printer subsystem (e.g. a formatter subsystem) and the power control unit is arranged to generate the required signals associated with the scanner subsystem and the formatter subsystem.

In the above example, the subsystems 12 are responsive to signals received from the power control unit 16 to cause a change in subsystem power consumption state. The subsystems may additionally cause a change in system power consumption state by sending a signal to the power control unit, which in turn interfaces with the remaining subsystems and the power supply unit to change the system power consumption state. For example, the system may be in a power saving state and a wireless communication subsystem may receive a request to wake up the system to the active state. The wireless communication subsystem sends a signal to the power control unit to cause the system to enter the active state. The signals generated by the subsystems for causing a change in system power consumption state may differ one from another and the power control unit is configured to interpret the signals received from each of the subsystems and control the system power consumption state in accordance with the received signal.

The power supply unit 14 is connected to the subsystems 12 for the supply of electrical power along power lines 18. The power supplied or available for use by a subsystem is dependent on the system power consumption state and the subsystems power consumptions states associated with each of the system power consumption states. Additionally, the power required by one subsystem when operating in one subsystem power consumption state may vary from the power required by another subsystem when operating in the same subsystem power consumption state. For example, the power supplied to a first subsystem in the active state of the subsystem may be 12V, in a sleep state 5V and in a fully off state 0V, whereas for a second subsystem the power required in corresponding states may be 8V, 5V and 0V. Therefore, when the system is active, 12V is supplied to the first subsystem and 8V is supplied to the second subsystem. In a power saving state of the subsystem, the subsystem power consumption state of the first subsystem may be an active state and the subsystem power consumption state of the second subsystem may be sleep state. In this case, the PSU is controlled by the power control unit to supply or make available 12V to the first subsystem and 5V to the second subsystem. The power control unit controls the PSU so that the PSU supplies the appropriate power required for each of the subsystems dependent on the subsystem power consumptions states required in each system power consumption state and on the inherent power requirements of the subsystems in each of the subsystem power consumption states.

The power control unit 16 interfaces with a processing unit 20 of the system. The processing unit determines the power requirements of the system for example when it is required that the system change power consumption state from an active state to a state which consumes less power.

As described above, the system has one power saving state and the subsystems have one power saving state. Alternatively, the system may have a plurality of power saving states which consume different amounts of power. Each of the plurality of power saving states corresponds to different configurations of subsystem states. Additionally, the subsystems may have a plurality of power saving states and the power requirement of the subsystems varies depending on the power saving state of the subsystems.

The consumption of power by a system is required to meet various international and national regulations. Such regulations include Energy Star and EuP which specify the usage of different system power states which consume reduced power whilst requiring certain user functionality of the system. The regulatory requirements change and are updated from time to time and new regulations are introduced, which makes the ongoing design of electronics architecture more complex. In known systems, the subsystems are required to interface with each other and with the power supply unit to control the power consumption state of the system. For example, if a system comprises eight subsystems and the system has four different system power consumption states, and each subsystem requires at least two signals per system power consumption state (enter and exit) the known system must manage at least 64 power interfacing signals. Additionally, it must be ensured that there is not any interference or collisions among the different power states, given the interaction existing in the system. This known system is therefore complicated to implement, and requires extensive modification to meet changing regulatory requirements. The system shown in FIG. 1 allows simpler implementation and easier modification to meet changing requirements, since the interfacing between the subsystems and between the subsystems and the power supply unit is controlled centrally by the power control unit 16. The power control unit and associated memory 20 can readily be updated to meet any new or amended requirements.

Table 1 below shows four system power consumption states as specified in the ACPI standard.

TABLE 1

| Global system state | Software runs | Latency | Power consumption | OS restart required | Safe to disassemble computer | Exit state electronically |
|---|---|---|---|---|---|---|
| G0 working | Yes | 0 | Large | No | No | Yes |
| G1 Sleeping | No | >0, varies with sleep state | Smaller | No | No | Yes |
| G2/S5 Soft Off | No | Long | Very near 0 | Yes | No | Yes |
| G3 Mechanical Off | No | Long | RTC battery | Yes | Yes | No |

The system power consumption states include G0 (Working), G1 (Sleeping), G2/S5 (Soft Off) and G3 (Mechanical Off). The remaining columns of Table 1 show other characteristics of system the corresponding with the system power consumption states. These characteristics include software runs, latency, power consumption, OS restart required, safe to disassemble computing device and exit state electronically.

Table 2 shows the different configurations of subsystem power states of the subsystems for the system power consumption states shown in Table 2 in order to meet Energy Star and EuP regulatory requirements.

TABLE 2

| | Formatter | Analog elex | Wifi Module | Scanner | Engine PCA | CP | Lan Card (JDI) | PSU | |
|---|---|---|---|---|---|---|---|---|---|
| Ready state | D0 | D0 | D0 | D0 | D0 | D0 | D0 | All voltages available | WORKING STATE |
| Energy Star G1 | D1 | D3 exception: waking-up sensors | D0 | D3 | D1 | D3 exception: power button | D1 | Only 5 Vstb voltage | SLEEP STATE |
| EuP Lot 26 G1 | D1 | D3 exception: waking-up sensors | D0 | D3 | D1 | D3 exception: power button | D1 | Only 5 Vstb voltage | |
| EuP Lot 6 G2 | D3 exception: RTC | D3 | D3 | D3 | D3 | D3 exception: power button | D3 | No voltages available. Waiting for wake signal | AUTO-OFF STATE |
| EuP Lot 6 G3 | D3 | D3 | D3 | D3 | D3 | D3 | D3 | ON | MECHANICAL OFF STATE |

The subsystem power consumption states shown are D0 (Full operation), D1 (Saving power mode, context loss) and D3 (Subsystem off). The power control unit controls the subsystem power consumption states D0, D1, D3 of the subsystems 12 in accordance with the required system power consumption state G0, G1, G2, G3. For example, in the system power consumption state G1, the formatter, engine PCA and LAN card are in subsystem power consumption state D1, the analog electronics subsystem is in a state D3 except for any wake-up sensors which are active, the control panel is in a state D3 except for the power button which is active and the wifi module is fully active. The PSU is controlled by the power control unit to supply 5V to those subsystems in states D0 and D1.

Figure 2:
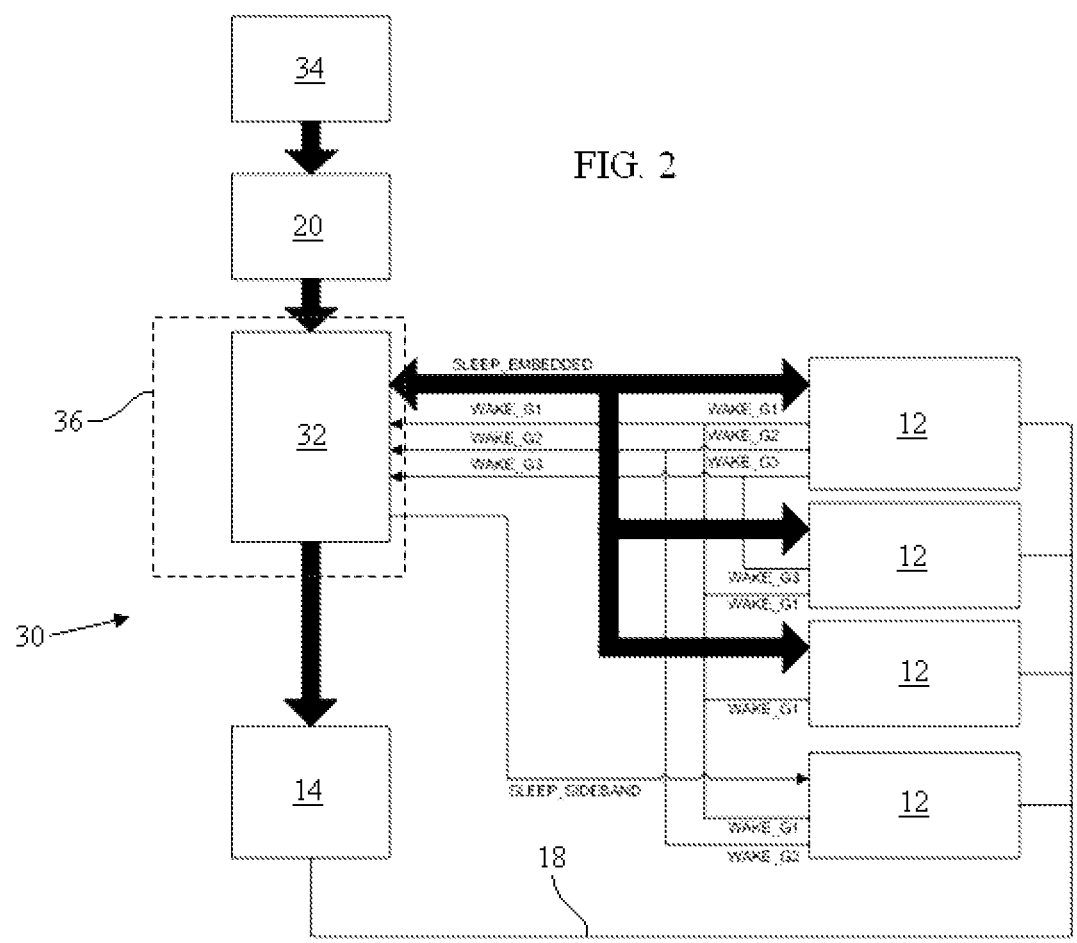
FIG. 2 is a schematic drawing of another system including a power control unit according to an example.

FIG. 2 shows another system 30 comprising a power control unit as shown in FIG. 1. The FIG. 2 is similar to system 10 shown in FIG. 1 and only those aspects of system 30 which differ from system 10 will be described in detail.

The system 30 has a plurality of power saving states G1, G2, G3 and an active G0, in accordance with Tables 1 and 2. The power control unit 32 is operable to control the power consumption states of the subsystems 12 and the power supplied to each of the subsystems by the power supply unit 14 dependent on which of the plurality of power saving states of the system is required.

State G0 is an active mode, state G1 may be a sleep mode, state G2 may be a hibernate mode and state G3 may be an OFF mode. In order to wake the system from a power saving state to a WAKE state, the power control unit 32 controls the power supplied to the subsystems 12 by the power supply unit 14. The state D0, D1, D3 of the subsystems is dependent on the power it receives and does not require additional control. For example, a subsystem 12 may receive 5V in a state D1 and 12V in a WAKE state D0. In order to wake the subsystem from state D1, the power supplied to it is changed from 5V to 12V. Conversely, the subsystem can be placed in a state D1 from a WAKE state by changing the power supplied to it from 12V to 5V. However, when changing the state of some of the subsystems to a state which consumes less power, the context within the subsystem may be lost if it is not given advance warning prior to changing the power supplied to it. The power control unit 32 sends signals to such subsystems prior to changing power state so that appropriate action can be taken by the subsystems. The power control unit subsequently controls the supply of power to change the state of the subsystems. There may be a timed delay between the advance warning and the state change or the power control unit may be arranged to monitor the status of the subsystems, for example by receiving from the subsystems a "ready to sleep" signal.

In FIG. 2, WAKE G1, WAKE G2 and WAKE G3 denote waking the system from respective power saving states G1, G2 and G3 to a WAKE state. The different subsystems may be responsive to different wake events in different power saving states. For example, in a printer system one subsystem may comprise a scanner lid and when the system is in state G1, a user lifting the lid causes the subsystem to emit a WAKE G1 signal. However, such a user action may not initiate waking when the system is in a state G2 or G3. In another example, a wireless communication subsystem may be responsive to a print command sent by a remote computer to emit WAKE G1 or WAKE G2 signals when the system state is G1 or G2. In a further example, a control panel subsystem may comprise a power button which is responsive to operation by a user to emit WAKE G1, WAKE G2 or WAKE G3 signals to wake the system from states G1, G2 or G3.

The signals WAKE G1, WAKE G2 or WAKE G3 are sent from an initiating subsystem 12 to the power control unit 32. In response to a received signal the power control unit controls the supply of power by the power supply unit 14 to each of the subsystems in order to wake the subsystems from the subsystem power states to the fully operational state.

A SLEEP signal is initiated in any one of a plurality of different ways for example in response to a timed period since last system use or through a user interface 34 and a central processing unit 20 of the system. The bold double-headed arrows in FIG. 2 referenced SLEEP EMBEDDED show two-way communication between the power control unit 32 and one or more of the subsystems. The single-headed arrow referenced SLEEP SIDEBAND shows one-way communication from the power control unit to one of the subsystems, although SLEEP SIDEBAND communication may be to more than one subsystem. SLEEP EMBEDDED communication is more sophisticated than SLEEP SIDEBAND. The SLEEP EMBEDDED communication may take the form of for example bus protocol, PCI express or application software, whereas SLEEP SIDEBAND may take the form of an electrical signal. The SLEEP EMBEDDED communication allows for example the power control unit 32 to monitor the status of the subsystems 12. In this way, the power control unit may delay changing a subsystem power state until critical information is saved as described above or receive information from the subsystems relating to the implementation of the power states (e.g. have the subsystems properly implemented waking to a fully operational state). The SLEEP SIDEBAND communication allows one-way communication of simple commands from the power control unit to one or more of the subsystems. The SLEEP SIDEBAND communication is therefore suited to relatively simpler subsystems for example a mechanical component which requires movement to a sleep position prior to changing power state.

In FIG. 2, the power control unit 32 is embedded in a controller hub 36 such as an ICH8 (Intel I/O controller hub), shown in broken lines. The controller hub also controls other peripheral items in the system. The controller hub is programmed to carry out the functions of the power control unit as described herein and to interface with the subsystems 12, the power supply unit 14 and other control or processing units 20 of the system.

What is claimed is:

1. A power supply for providing the power consumed by a system having a plurality of electrical power consumption states including an active state and multiple power saving states, the system comprising a plurality of subsystems each having a plurality of subsystem power states including an active state and at least one power saving state, wherein a first subsystem has a plurality of power saving states,
    wherein the electrical power consumption states of the system correspond to respective different configurations of subsystem power states of the subsystems, and
    wherein the power supply provides a voltage to the first subsystem, wherein the first subsystem determines the state of the subsystem by a received non-zero voltage level and the first subsystem adjusts the state of the first subsystem based on detected increases and decreases in voltage level provided to the first subsystem by the power supply.

2. A power supply as claimed in claim 1, wherein the power supply is arranged to receive an input signal from at least one of the subsystems for initiating a change of system power state and to output voltages to the subsystems dependent on the received input signal.

3. A power supply as claimed in claim 2, wherein the power supply is arranged to receive a plurality of different input signals from a subsystem for initiating a change of system power state to a respective plurality of system power states.

4. A power supply as claimed in claim 3, wherein the power supply is responsive to a sleep event by lowering a voltage provided to a subsystem.

5. A power supply as claimed in claim 4, wherein prior to adjusting a voltage to the subsystems in response to a sleep event, the power supply interfaces with the subsystems to provide advance warning of a change in system power state.

6. A power supply as claimed in claim 5, wherein the power supply is responsive to a wake signal from a subsystem by increasing a voltage provided to the subsystem.

7. A power supply as claimed in claim 6, wherein the power requirements of at least one subsystem differs from the power requirements of another subsystem at least in the active state and the power supply is arranged to supply different voltages to the subsystems dependent on each of the power requirements of the subsystems.

8. A power supply claimed in claim 7, wherein the power supply is arranged to supply different amounts of power to the subsystems depending on the power consumption states of each of the subsystems.

9. An electrically powered digital system having a plurality of electrical power consumption states including an active state and at least one power saving state, the system comprising a plurality of subsystems each having a plurality of subsystem power states including an active state and at least one power saving state, the electrical power consumption states of the system corresponding to respective different configurations of subsystem power states of the subsystems, a power supply unit for supplying power to the subsystems, wherein a subsystem has first and second power saving states, wherein the first power saving state provides no active functions from the subsystem and reduces latency to return to the active state compared with the second power saving state and when the subsystem is the first power saving state, the power supply unit provides a non-zero voltage to the subsystem that is less than a voltage supplied to the subsystem when the subsystem is in the active state and wherein the non-zero voltage is detected by the subsystem and used to determine the state of a subsystem and both increases and decreases in non-zero voltage levels detected by a subsystem induce state changes in the subsystem.

10. An electrically powered digital system as claimed in claim 9, wherein the system has a plurality of power saving states and the subsystems each have a plurality of power saving states and the power supply unit provides different voltages to the subsystems dependent on which of the plurality of power saving states of the system is required.

11. An electrically powered digital system as claimed in claim 10, wherein the system is a printer and the subsystems are printer subsystems.

12. A printer having an active state and a plurality of power saving states, the printer comprising:
a plurality of subsystems each having an active state and at least one power saving state, the power requirements of the subsystems being dependent on the state of each of the subsystems and the printer states corresponding to respective different configurations of subsystem states;
a power supply unit for supplying power to the subsystems, wherein the power supply unit supplies a non-zero voltage to a subsystem in a power saving state, the non-zero voltage being less than a voltage supplied during the subsystem active state wherein a voltage is supplied to each of the subsystems by the power supply unit dependent on which of the plurality of power saving states of the printer is required, and a non-zero voltage less than a maximum voltage received by the subsystem is used by the subsystem to set the state of the subsystem.

13. A printer as claimed in claim 12, wherein the printer has a plurality of power saving states and the subsystems each have a plurality of power saving states and the power supply unit provides different voltages to the subsystems dependent on which of the plurality of power saving states of the system is required.

14. A power supply as claimed in claim 1, wherein at least one of the subsystems has a reduced power state in which that subsystem receives a non-zero voltage from the power supply and in which the subsystem is inactive.

15. A power supply as claimed in claim 1, wherein at least one of the subsystems has a reduced power state that reduces latency to return the subsystem to an active state compared to a second reduced power state of the subsystem.

16. A power supply as claimed in claim 1, wherein there is a timed delay between notification of a change of voltage being supplied to at least one of the subsystems and implementation of that change of voltage being supplied to that subsystem.

17. A power supply as claimed in claim 1, wherein the power supply provides a notice of an impending voltage change to a subsystem and awaits a confirmation signal from the subsystem before implementing the voltage change.

18. A power supply as claimed in claim 1, wherein the power supply monitors a status of a subsystem before changing a power level supplied to that subsystem.

19. A power supply as claimed in claim 1, wherein the power supply provides notification to a subsystem before reducing power to that subsystem but not before increasing power to that subsystem.

20. A power supply as claimed in claim 1, wherein no wake signal is provided to a subsystem besides an increase in voltage from the power supply.

* * * * *

UNITED STATES PATENT AND TRADEMARK OFFICE
CERTIFICATE OF CORRECTION

| | | |
|---|---|---|
| PATENT NO. | : 9,436,268 B2 | Page 1 of 1 |
| APPLICATION NO. | : 13/628954 | |
| DATED | : September 6, 2016 | |
| INVENTOR(S) | : Sergio de Santiago DomÍnguez et al. | |

It is certified that error appears in the above-identified patent and that said Letters Patent is hereby corrected as shown below:

In Column 7, Line 22, in Claim 8, delete "supply claimed" and insert -- supply as claimed --, therefor.

Signed and Sealed this
Tenth Day of January, 2017

Michelle K. Lee
*Director of the United States Patent and Trademark Office*